(12) United States Patent
Xiao et al.

(10) Patent No.: US 12,149,201 B2
(45) Date of Patent: Nov. 19, 2024

(54) FLAT PHOTOVOLTAIC TILE, INSTALLATION METHOD AND COVERING OBTAINED

(71) Applicant: ONDULINE, Suresnes (FR)

(72) Inventors: Jun Xiao, Beijing (CN); Junfeng Liu, Beinjing (CN)

(73) Assignee: ONDULINE, Suresnes (FR)

( * ) Notice: Subject to any disclaimer, the term of this patent is extended or adjusted under 35 U.S.C. 154(b) by 0 days.

(21) Appl. No.: 17/769,290

(22) PCT Filed: Oct. 15, 2020

(86) PCT No.: PCT/EP2020/079123
§ 371 (c)(1),
(2) Date: Apr. 14, 2022

(87) PCT Pub. No.: WO2021/074339
PCT Pub. Date: Apr. 22, 2021

(65) Prior Publication Data
US 2024/0146235 A1    May 2, 2024

(30) Foreign Application Priority Data

Oct. 18, 2019   (FR) ...................................... 1911718

(51) Int. Cl.
*H02S 20/25* (2014.01)
*E04D 1/16* (2006.01)

(52) U.S. Cl.
CPC ................ *H02S 20/25* (2014.12); *E04D 1/16* (2013.01)

(58) Field of Classification Search
CPC ....... H01L 31/00–078; Y02E 10/50–60; H02S 20/22–26; H02S 30/10
(Continued)

(56) References Cited

U.S. PATENT DOCUMENTS

2007/0157963 A1* 7/2007 Metten .................. F24S 25/632
                                                          136/251
2008/0302030 A1* 12/2008 Stancel ............... H01L 31/0521
                                                          136/246
(Continued)

FOREIGN PATENT DOCUMENTS

CN         101922212       12/2010
CN         201 771 114      3/2011
(Continued)

OTHER PUBLICATIONS

JP-2010242349-A English (Year: 2010).*
(Continued)

*Primary Examiner* — Bach T Dinh
(74) *Attorney, Agent, or Firm* — NIXON & VANDERHYE

(57) ABSTRACT

A flat photovoltaic tile includes a shell made from plastic material and a photovoltaic element in a recess. The tile has front and rear faces, upstream and downstream edges, two right and left lateral edges. Overlapping portions ensure at least water-tightness against liquid water. The tile includes an electrical connection, the rear face including, towards the upstream edge, a tenon intended to hold the tile on a retaining device, in particular a batten. At the photovoltaic element, the tile includes, in its thickness, from the rear face towards the front face: a part of the shell a rear panel, a lower EVA film, a silicon photovoltaic conversion plate, an upper EVA film, and a tempered glass transparent layer, and, elsewhere, the tile includes, in its thickness, the plastic material of the shell.

20 Claims, 17 Drawing Sheets

(58) Field of Classification Search
USPC .................................................. 136/243–265
See application file for complete search history.

(56) References Cited

U.S. PATENT DOCUMENTS

| | | | |
|---|---|---|---|
| 2014/0000709 | A1 | 1/2014 | Langmaid et al. |
| 2015/0354217 | A1* | 12/2015 | Lucas ........................ E04D 1/30 52/747.1 |

FOREIGN PATENT DOCUMENTS

| | | |
|---|---|---|
| CN | 201756768 | 3/2011 |
| CN | 201756769 | 3/2011 |
| CN | 202 672 520 | 1/2013 |
| CN | 103485491 | 1/2014 |
| CN | 204804185 U | 11/2015 |
| CN | 109750796 A | 5/2019 |
| EP | 2 262 003 | 12/2010 |
| EP | 2 442 371 | 4/2012 |
| FR | 2 755 712 | 5/1998 |
| FR | 2 979 753 | 3/2013 |
| FR | 3 001 480 | 8/2014 |
| FR | 2 942 253 | 8/2018 |
| JP | 2003 161003 | 6/2003 |
| JP | 2010242349 A * | 10/2010 |
| WO | 2000/030184 | 5/2000 |
| WO | 2011/048565 | 4/2011 |
| WO | 2016/099994 | 6/2016 |

OTHER PUBLICATIONS

International Search Report for PCT/EP2020/079123 dated Dec. 3, 2020, 6 pages.
Written Opinion of the ISA for PCT/EP2020/079123 dated Dec. 3, 2020, 9 pages.
Office Action, issued in Chinese Patent Application No. 202080072569.2 dated Feb. 8, 2024.

* cited by examiner

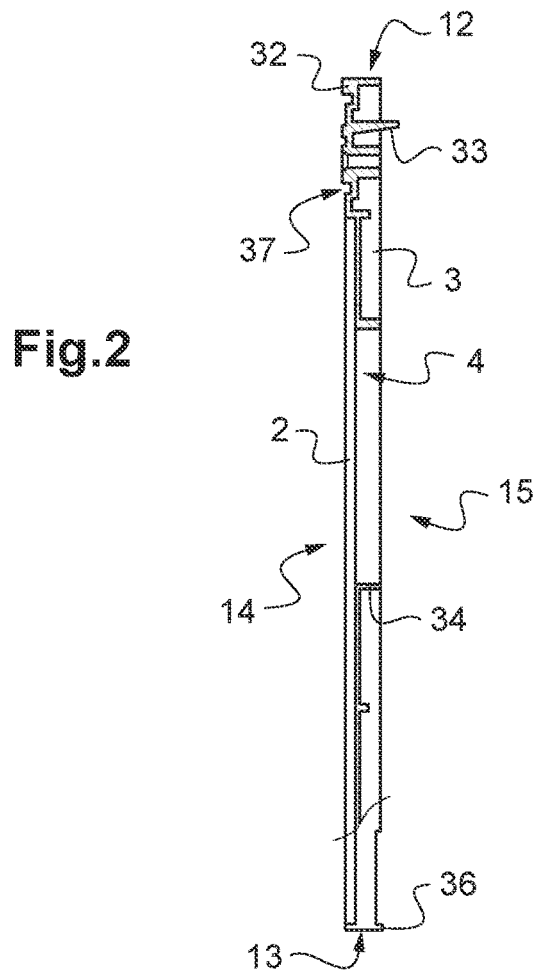
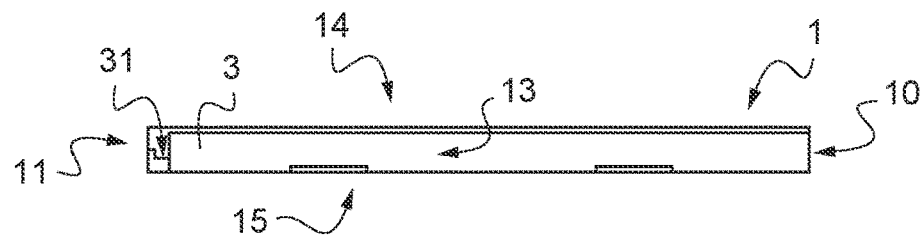
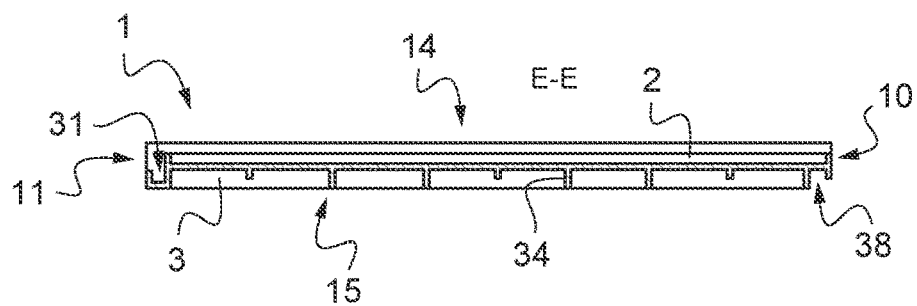

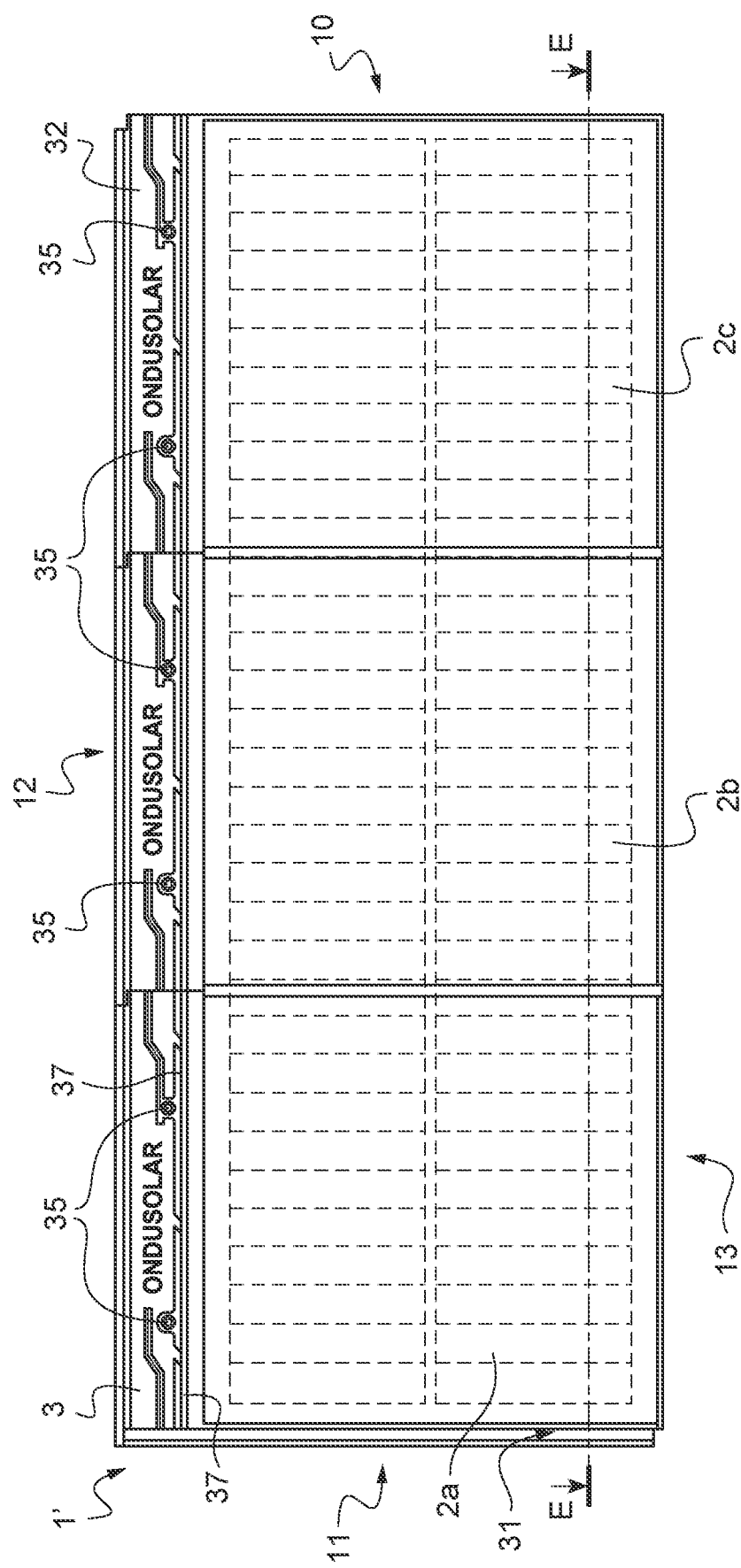

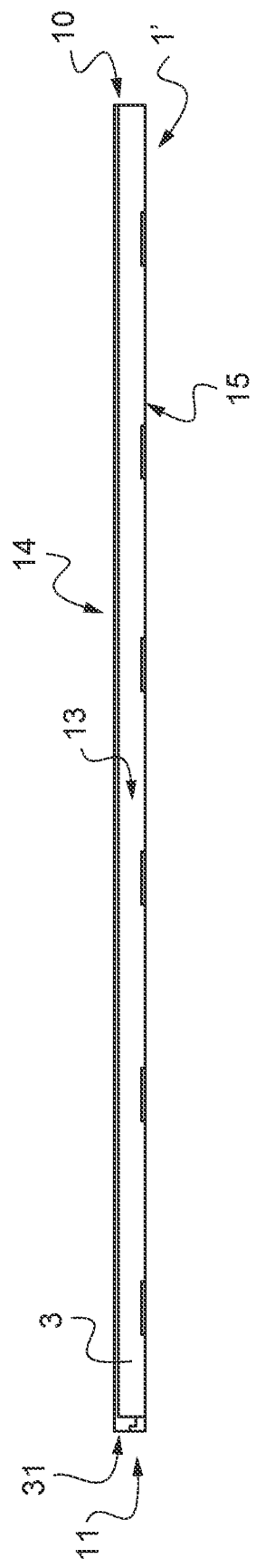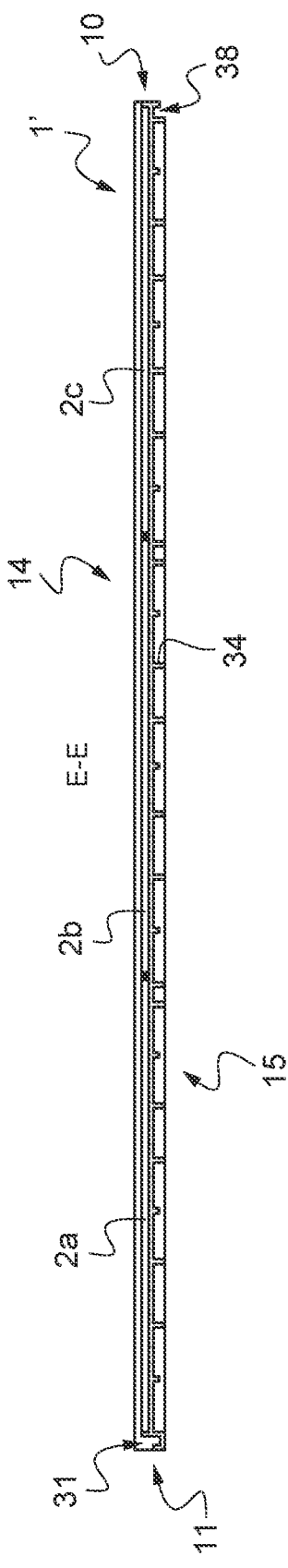

FLAT PHOTOVOLTAIC TILE, INSTALLATION METHOD AND COVERING OBTAINED

CROSS-REFERENCE RELATED TO PRIORITY APPLICATIONS

This application is the U.S. national phase of International Application No. PCT/EP2020/079123 filed Oct. 15, 2020 which designated the U.S. and claims priority to FR1911718 filed Oct. 18, 2019, the entire contents of each of which are hereby incorporated by reference.

BACKGROUND OF THE INVENTION

Field of the Invention

The present invention generally relates to the field of building covering elements and, more particularly, a flat photovoltaic tile, as well as an installation method and the covering obtained. It has applications in the field of construction and renovation of building roofs.

Description of the Related Art

Pitched roofs exposed to solar radiation are interesting supports for photovoltaic power generation devices. Traditionally, such generation devices are installed on supports attached to the roof, which has a covering, typically tiles, corrugated sheets or equivalent.

It has been proposed to use tiles including power generation devices, for example, in documents WO 2000/30184, CN103485491A, CN201771114U, CN201756769U, CN201756768U or CN101922212A.

Also known are the following documents, disclosing various types of photovoltaic tiles and roof-related accessories: WO 2011/048565 A1, WO 2016/099994 A1, EP 2 262 003 A1, FR 2 979 753 A1, FR 2 755 712 A1, US 2014/000709 A1, JP 2003 161003 A, CN 202 672 520 U and CN 201 771 114 U.

This type of tile may pose various problems, in particular watertightness, difficulty of installation, overheating, wiring . . . .

The present invention proposes a new solution making the tile installation and wiring easier and making it possible to avoid overheating risks.

SUMMARY OF THE INVENTION

It is therefore proposed according to the invention a flat photovoltaic tile intended to form a covering for a pitched roof by juxtaposing a set of tiles in partial edge-to-edge overlap, the tile including a shell and a flat photovoltaic power generation element, the shell being rigid and made of plastic material, the photovoltaic element being fastened in a housing formed in the shell thickness, the tile having two opposite faces and four edges:
  a front face and a rear face, the front face being intended to receive a solar radiation,
  an upstream edge and a downstream edge, opposite and parallel to each other, the upstream edge being intended to be installed higher than the downstream edge in the pitched roof covering, an upstream part located along the upstream edge of the tile being intended to be overlapped by a downstream part located along the downstream edge of at least another tile of the covering,
  a right lateral edge and a left lateral edge, opposite and parallel to each other, two lateral parts along the two right and left lateral edges being intended to respectively overlap and be overlapped by lateral parts of the left and right lateral edges, respectively, of two other adjacent tiles of a same row of tiles of the covering,
the overlapping lateral parts of the tiles as well as the overlapping upstream part and downstream part of the tiles being configured in such a way as to ensure watertightness to at least the liquid water flowing on the roof,
the photovoltaic element forming a power generation area, the tile being configured in such a way that said power generation area extends over the tile outside of the tile parts that are intended to be overlapped, the tile further including an electrical connection means for exporting the power generated by the photovoltaic element,
the rear face including, towards the upstream edge, at least one tenon protruding rearward from the general flat extent of the rear face, said at least one tenon being intended to hold the tile on a holding device, in particular a batten, and
on the one hand, in the power generation area, the tile includes, in its thickness, from the rear face towards the front face:
  a shell part,
  a rear panel,
  a lower Ethylene Vinyl Acetate film,
  at least one silicon-based photovoltaic conversion plate,
  an upper Ethylene Vinyl Acetate film, and
  a transparent layer consisted of tempered glass, and
on the other hand, outside of the power generation area, the tile includes, in its thickness, the plastic material of the shell.

Other non-limitative and advantageously features of the photovoltaic tile according to the invention, taken individually or according to all the technically possible combinations, are the following:
  the upstream part of a tile is overlapped by a downstream part of another tile when the tiles are aligned along the roof pitch line,
  the upstream part of a tile is overlapped by downstream parts of two other tiles when the tiles are staggered along the roof pitch line,
  the transparent tempered glass layer is extended only on the photovoltaic element,
  the overlapping lateral parts of two tiles are complementary to each other, in order to ensure watertightness to at least the liquid water flowing on the roof,
  the complementary overlapping lateral parts include, for one, a groove and, for the other, a counter-groove,
  the complementary overlapping lateral parts include, for one, a groove and, for the other, a counter-groove, at least one of the groove and the counter-groove including a flexible gasket,
  in the complementary overlapping lateral parts, the groove and the counter-groove are facing each other,
  in the complementary overlapping lateral parts, the groove and the counter-groove are offset relative to each other,
  the complementary overlapping right and left lateral parts include, for one, a groove and, for the other, a protruding line,
  the complementary overlapping right and left lateral parts include, for one, a groove and, for the other, a protruding line, at least one of the groove and the protruding line including a flexible gasket, in the complementary overlapping right and left lateral parts, the groove and the protruding line are facing each other, the protruding line and its potential gasket fitting into the groove, the overlapping upstream and downstream parts of two tiles are complementary to each other in order to ensure watertightness to at least the liquid water flowing on the roof, the complementary overlapping upstream and downstream parts include, for one, a groove and, for the other, a counter-groove, at least one of the groove and the counter-groove including a flexible gasket, in the complementary overlapping upstream and downstream parts, the groove and the counter-groove are facing each other, in the complementary upstream and downstream parts, the groove and the counter-groove are offset relative to each other, the complementary overlapping upstream and downstream parts include, for one, a groove and, for the other, a protruding line, at least one of the groove and the protruding line including a flexible gasket, in the complementary overlapping upstream and downstream parts, the groove and the protruding line are facing each other, preferably, the front face of the photovoltaic tile includes a groove on the overlapped upstream part and along the overlapped lateral edge, the groove or protruding line flexible gasket is prominent to fit into the facing groove when overlapping, when the two grooves each include a flexible gasket, the two gaskets come against each other when overlapping, preferably, on the front face of the photovoltaic tile, the groove on the overlapped upstream part and the groove along the overlapped lateral edge communicate with each other in order to allow any liquid water in the groove to flow down the roof pitch, preferably, on the front face of the photovoltaic tile, the lower end of the groove along the lateral edge is open in order to allow any liquid water in the groove to flow on the downstream tile, down the roof pitch, the upstream part includes through-holes for the passage of fasteners to fasten the tile to the roof, the through-holes are substantially perpendicular to the general plane of the tile, the fasteners are in particular spikes, nails or screws, the holding device is a corrugated sheet with recessed areas in the convex part of its corrugations, the recessed areas are aligned, the recessed areas of the holding device allow the tiles to be held by their tenons, the upstream part of the photovoltaic tile includes through-holes for the fastening of the tile, in particular by spikes, nails or screws, to an element of the roof frame and by passing through the corrugated sheet, when the tile is held on the corrugated sheet by said at least one tenon, the holding device is a batten or lath, these two words being considered as equivalent in the context of the invention, the batten is a raw wood rod, the batten is a moulded plastic material rod, the upstream part of the photovoltaic tile includes through-holes for the fastening of the tiles to the batten, in particular by spikes, nails or screws, when the tile is held on said batten by said at least one tenon, as an alternative, the transparent layer is made of polycarbonate, the polycarbonate is optically structured at its photovoltaic element-side surface, the polycarbonate is coloured in the mass, the tempered glass is optically structured at its photovoltaic element-side surface, the tempered glass is coloured in the mass, the rear face of the photovoltaic tile includes a pair of tenons, the silicon-based plate of the photovoltaic element is hermetically encapsulated in the Ethylene Vinyl Acetate film, the electrical connection means passing through the film, the lower Ethylene Vinyl Acetate film is attached to the upper Ethylene Vinyl Acetate film, the lower Ethylene Vinyl Acetate film is attached to the upper Ethylene Vinyl Acetate film along the perimeter of the photovoltaic element, the lower Ethylene Vinyl Acetate film is welded to the upper Ethylene Vinyl Acetate film, the lower Ethylene Vinyl Acetate film is bonded to the upper Ethylene Vinyl Acetate film, the Ethylene Vinyl Acetate film is created directly around the silicon-based plate by deposition of the Ethylene Vinyl Acetate, the silicon-based plate is vacuum-encapsulated into the Ethylene Vinyl Acetate film, the plate is made of monocrystalline silicon, the plate is made of polycrystalline silicon, the flat photovoltaic tile includes one photovoltaic element, the flat photovoltaic tile includes two photovoltaic elements each having its electrical connection means, the flat photovoltaic tile includes three photovoltaic elements each having its electrical connection means, the flat photovoltaic tile includes one or several photovoltaic elements each having its electrical connection means, the flat photovoltaic tile includes two photovoltaic elements having a single electrical connection means, the photovoltaic elements being electrically connected to each other within the tile, the flat photovoltaic tile includes three photovoltaic elements having a single electrical connection means, the photovoltaic elements being electrically connected to each other within the tile, the flat photovoltaic tile includes one or several photovoltaic elements having a single electrical connection means, the photovoltaic elements being electrically connected to each other within the tile, the photovoltaic elements electrically connected to each other within the tile are connected in series, the photovoltaic elements electrically connected to each other within the tile are connected in parallel, the photovoltaic elements electrically connected to each other within the tile are connected in parallel and in series according to the photovoltaic elements, the photovoltaic element is consisted of a photovoltaic generation unit including at least two silicon-based photovoltaic conversion plates, the photovoltaic element including a single rear panel common to the silicon-based plates, a single lower Ethylene Vinyl Acetate film common to the silicon-based plates, a single upper Ethylene Vinyl Acetate film common to the silicon-based plates, and a single transparent layer common to the silicon-based plates, the generation unit having only one electrical connection means common to the silicon-based plates, the silicon-based plates being electrically connected to each other within the tile, the photovoltaic generation unit includes two silicon-based plates, the photovoltaic generation unit includes three silicon-based plates, the silicon-based plates electrically connected to each other within the tile are connected in series, the silicon-based plates electrically connected to each other within the tile are connected in parallel, the silicon-based plates electrically connected to each other within the tile are connected in parallel and in series according to the photovoltaic elements, the housing formed in the shell thickness has a flat bottom and the flat bottom of the housing includes a through-hole for the passage of the electrical connection means arranged on the rear side of the photovoltaic element, the shell includes reinforcement ribs on the tile rear face, the ribs are parallel to the lateral edges, the ribs are parallel to the upstream and downstream edges, the ribs are oblique with respect to the lateral and upstream and downstream edges, the tile upstream part, intended to be overlapped, further includes on its front face at least one hole, and the tile downstream part further includes on its rear face on least one tab protruding rearward, said at least one hole and at least one tab being of complementary shapes in such a way that, when the tile upstream part is overlapped by the downstream part of another tile, the tab of the other tile is engaged into the hole of the tile, said at least one tab protrudes rearward from the general flat extent of the rear face, said at least one hole includes a bottom, it is hence closed, said at least one hole and said at least one tab have complementary shapes including interlocking means, said interlocking means are of the clipping type, the tile has a substantially uniform thickness, said thickness being between 30 mm and 15 mm and being preferably about 20 mm, the substantially uniform thickness is considered without the tenon(s) and the potential tab(s), the tile is rectangular in shape, the tile overlapping width, on the upstream and downstream edge sides, is between 60 mm and 90 mm, preferably, the tile overlapping width, on the upstream and downstream edge sides, is between 68 mm and 88 mm or is between 74 mm and 81.5 mm, in particular, the tile overlapping width, on the upstream and downstream edge sides, is about 78 mm, the tile overlapping width, on the lateral right and left edge sides, is between 10 mm and 35 mm, preferably, the tile overlapping width, on the lateral right and left edge sides, is about 11 mm or about 30 mm, the tile upstream edge and downstream edge each have an identical length between 380 mm and 260 mm, preferably, the tile upstream edge and downstream edge each have an identical length between 365 mm and 360 mm, in particular, the tile upstream edge and downstream edge each have an identical length of about 355 mm or about 374 mm, the tile upstream edge and downstream edge each have an identical length between 1000 mm and 1100 mm, preferably, the tile upstream edge and downstream edge each have an identical length between 1053 mm and 1048 mm, in particular, the tile upstream edge and downstream edge each have an identical length of about 1043 mm or about 1062 mm, each tile lateral edge has an identical length between 480 mm and 380 mm and that is preferably about 440 mm, the transparent layer has a thickness between 4 mm and 2 mm and that is preferably about 3.2 mm, the plastic material of the shell has a minimum thickness at any point between 4 mm and 2 mm ant that is preferably about 3 mm, said minimum thickness being considered along a direction perpendicular to the general plane of the tile, the rear panel has a thickness between 0.4 mm and 0.2 mm and that is preferably about 0.35 mm, the photovoltaic element has a thickness of about 4.5 mm, each Ethylene Vinyl Acetate film has a thickness between 0.8 mm and 0.2 mm and that is preferably about 0.5 mm, the plastic material of the shell is chosen among: ABS, PA-6, PA-6,6, PE-HD, PE-LD, amorphous PET, crystalline PET, PMMA, PP, "crystal" PS, rigid PVC, the plastic material of the shell is Polycarbonate including glass fibres, an opacifier and a flame retardant, the plastic material of the shell is preferably Polyphenylene Oxide (PPO) including glass fibres and a flame retardant, the plastic material of the shell is preferably anti-UV (anti-ultraviolet) treated, the glass fibre and the flame retardant are dosed at 5% to 10% by weight in the PPO, the electrical connection means is consisted of two flexible electrical cables exiting from the tile rear face, the electrical connection means includes the two through-hole made conductive and forming female parts, the two through-holes made conductive and forming female parts of the electrical connection means are specific connectors, having preferably similar properties to MC4 connectors, conversely, the two through-holes are replaced by two rearward pins compatible with a batten having two connection receiving holes for said pins, in the case where the electrical connection means is consisted of two through-holes made conductive or are two pins, then one of the holes or pins is of positive polarity and the other is of negative polarity, in the case where the electrical connection means includes the two through-holes, the upper end of each hole is closed by a breakable or removable membrane, the electrical connection means is consisted of two connectors (+ and −) located on the rear face of the tile, the electrical connection means is consisted of two connectors (+ and −) located on the rear face of the rear panel, the electrical connection means includes MC4 connectors or compatible.

The invention also relates to a method for installing photovoltaic tiles in which, on a pitched roof including holding devices aligned in several rows, parallel to a ridge line of the roof, the holding devices being chosen among the battens and the corrugated sheets having recessed areas in the convex part of their corrugations, a set of flat photovoltaic tiles according to the invention is installed, starting from the bottom of the roof, each tile being first held by its tenon(s) on the corresponding holding device before being fastened by fasteners to the corresponding batten or to an element of the roof frame by passing through the corresponding corrugated sheet, before installation of the upper row tile, the fasteners being passed through the through-holes of the tile upstream part. Preferably, the electrical connection means of the tiles are connected to each other before fastening of the tiles.

The invention finally relates to a roof covering including a juxtaposition of a set of flat photovoltaic tiles according to the invention, the covering including battens and (in combination)/or (as an alternative) corrugated sheets having recessed areas in the convex part of their corrugations.

BRIEF DESCRIPTION OF THE DRAWINGS

FIG. 2 shows a right lateral edge side view of the photovoltaic tile of FIG. 1, FIG. 3 shows an upstream edge side view of the photovoltaic tile of FIG. 1, FIG. 4 shows a cross-sectional view along line E-E of the photovoltaic tile of FIG. 1, FIG. 5 shows a front top view of a photovoltaic tile including three photovoltaic generation units, FIG. 7 shows an upstream edge side view of the photovoltaic tile of FIG. 5, FIG. 8 shows a cross-sectional view along line E-E of the photovoltaic tile of FIG. 5.

DESCRIPTION OF THE PREFERRED EMBODIMENTS

Figure 1:
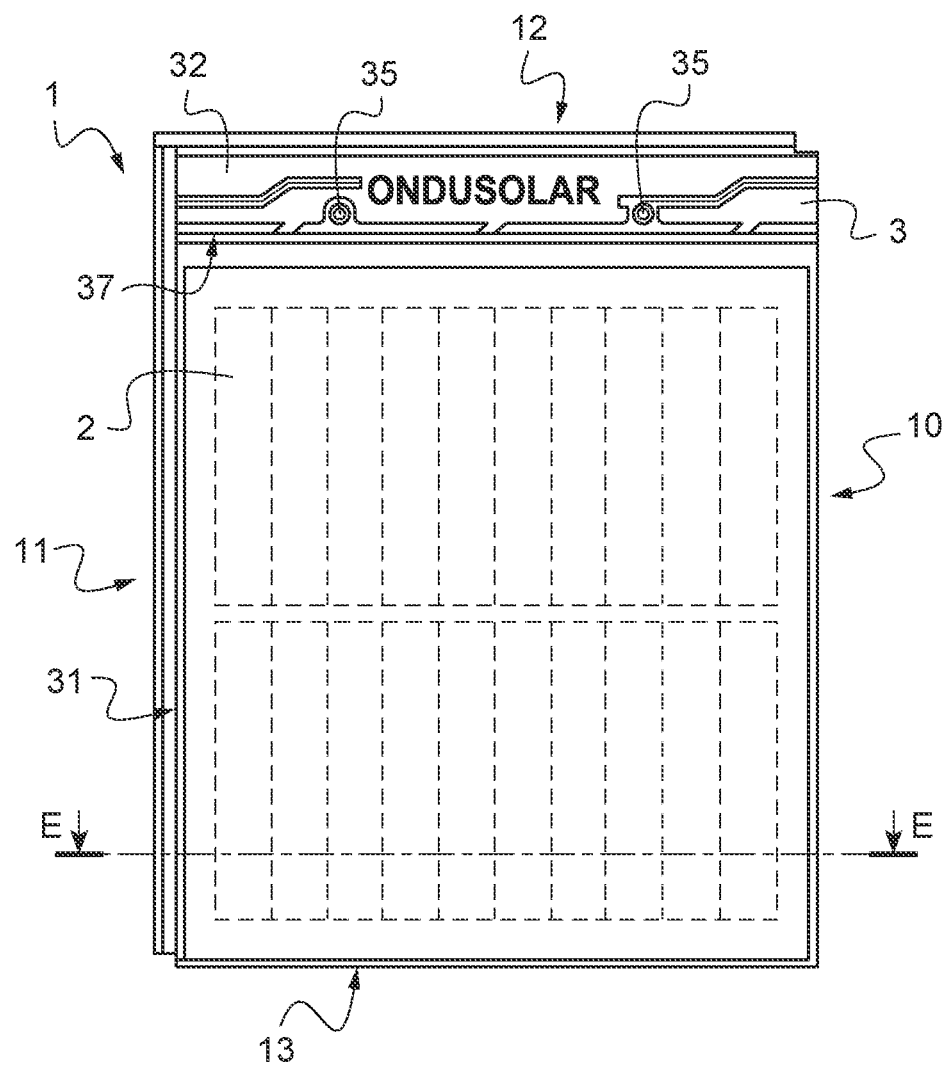
FIG. 1 shows a front top view of a photovoltaic tile including a single photovoltaic generation unit.
Figure 6:
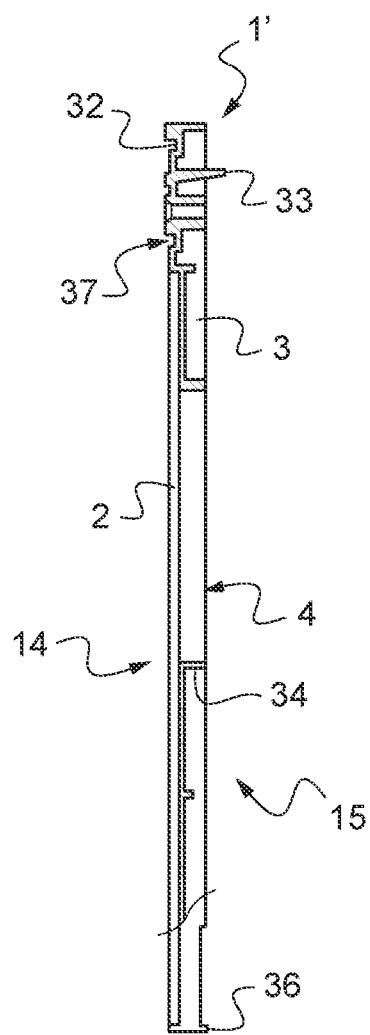
FIG. 6 shows a right lateral edge side view of the photovoltaic tile of FIG. 5.

The following description in relation with the appended drawings, given by way of non-limitative examples, will allow a good understanding of what the invention consists of and of how it can be implemented.

The photovoltaic tile 1, 1' is a square element or, as in FIGS. 1 to 8 and 13 to 16, a rectangular element. The photovoltaic tile 1, 1' has a front face 14 and a rear face 15, two right 10 and left 11 lateral edges, opposite and parallel to each other, an upstream edge 12 and a downstream 13, opposite and parallel to each other. The photovoltaic tile 1, 1' is flat and defines a general flat extent, just as its two faces, except at least one tenon 33 that protrudes from the general plane of the rear face 15 and an electric connection means 20 including two flexible electrical connection cables (FIGS. 13 and 14), a positive one and a negative one, with MC4 connectors. In particular, the front face 14 is essentially flat in order to facilitate periodic cleaning of the tiles and to prevent debris from being retained. In particular, the space between the two lateral edges of two laterally adjacent tiles (=of a same row, the tiles overlapping each other laterally along the lateral edges) is minimized and may even possibly be filled with a sealing paste, for example silicone, which is planed/level with the front face 14.

Figure 17:
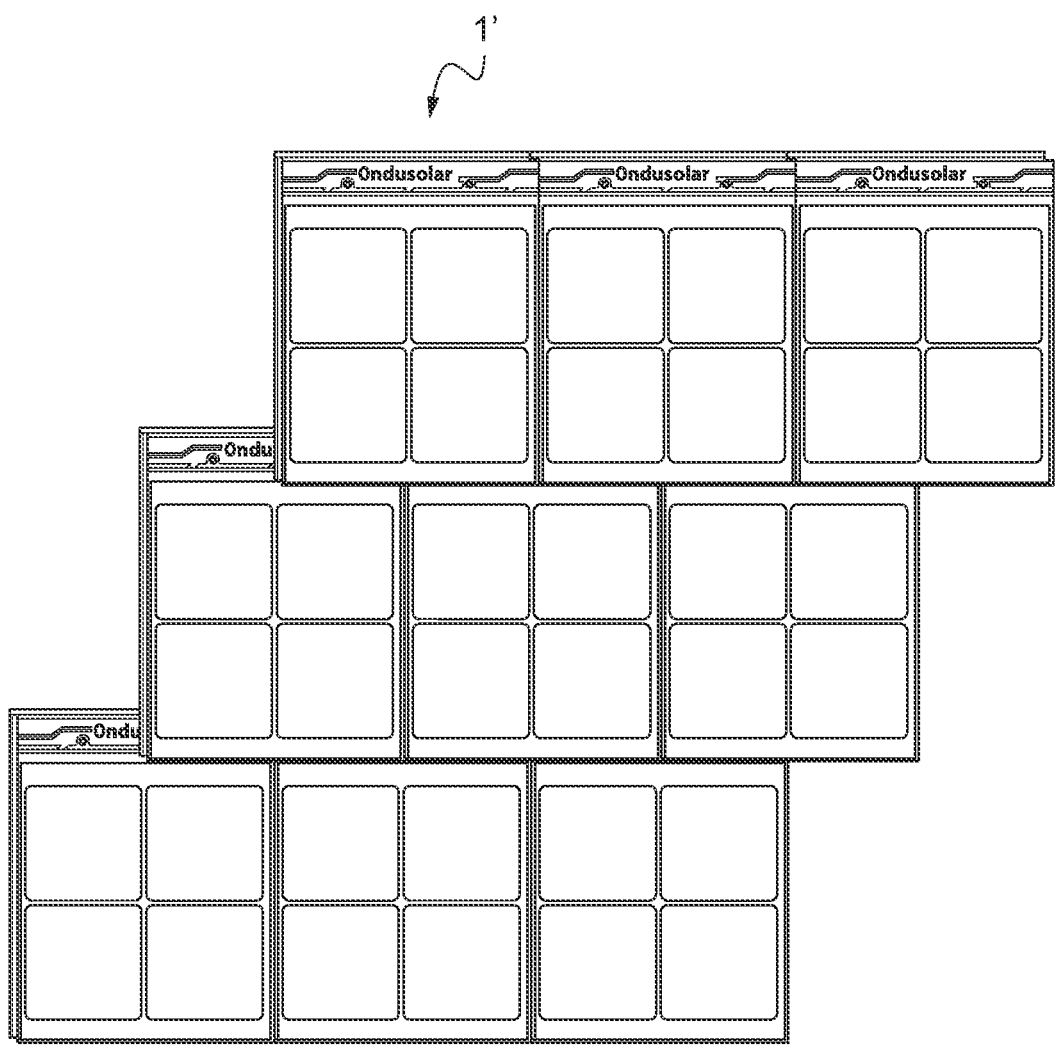
FIG. 17 shows a front view of a covering part with photovoltaic tiles using two types of photovoltaic elements, just as the following.
Figure 18:
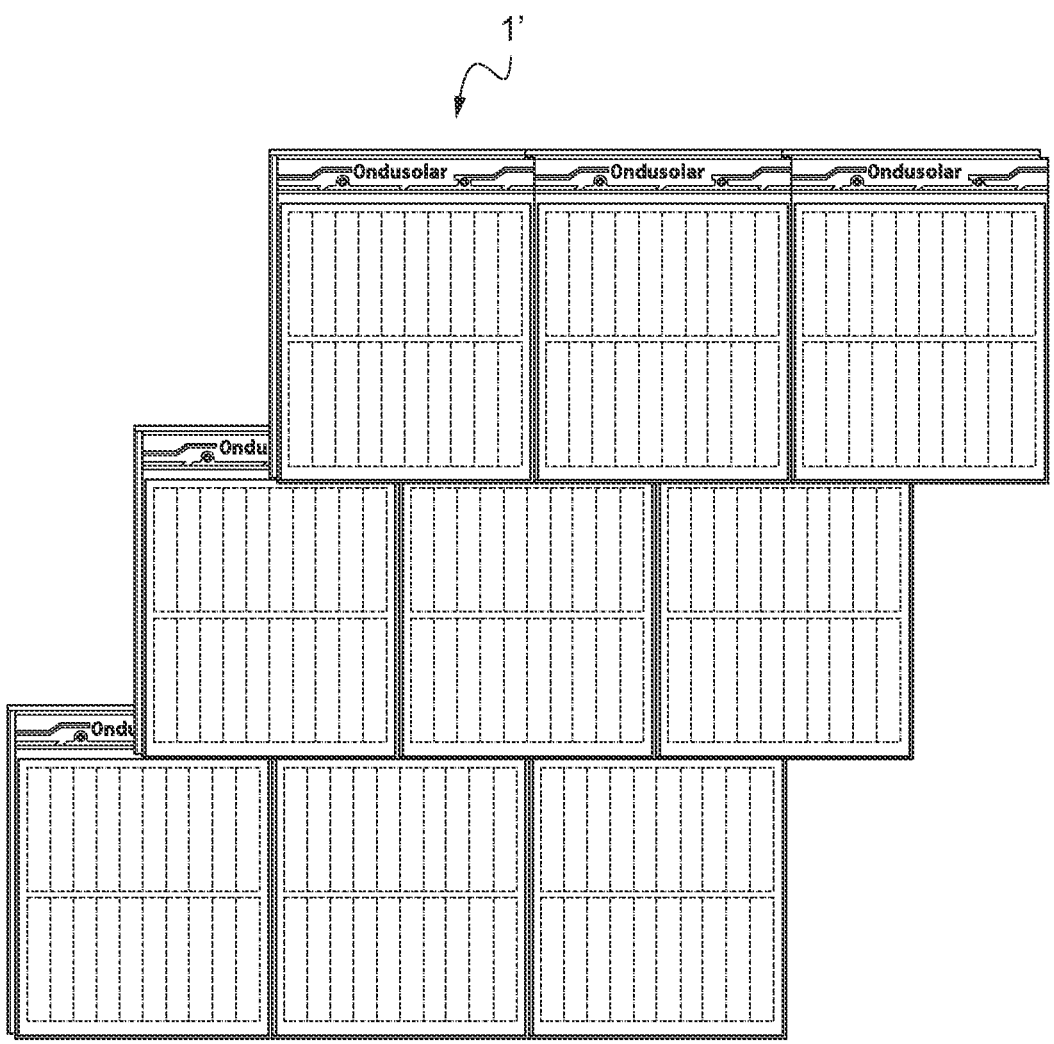
FIG. 18 shows a front view of a covering part with photovoltaic tiles using two types of photovoltaic elements.

The photovoltaic tile 1, 1' is intended to be installed on a pitched roof and its upstream edge 12 is installed higher than its downstream edge 13 along the pitch. On the roof, the photovoltaic tiles 1, 1' are traditionally installed in parallel rows, each row being aligned in a horizontal line or at least parallel to the roof ridge line. Due to their shape, the photovoltaic tiles 1, 1' can be aligned in parallel lines along the roof pitch (that is to say, perpendicular to the rows) or, preferably, be staggered, as shown in FIGS. 17 and 18. The front face 14 of the photovoltaic tile 1, 1' is directed towards the sky on the roof because it is intended to receive solar radiation.

Figure 15:
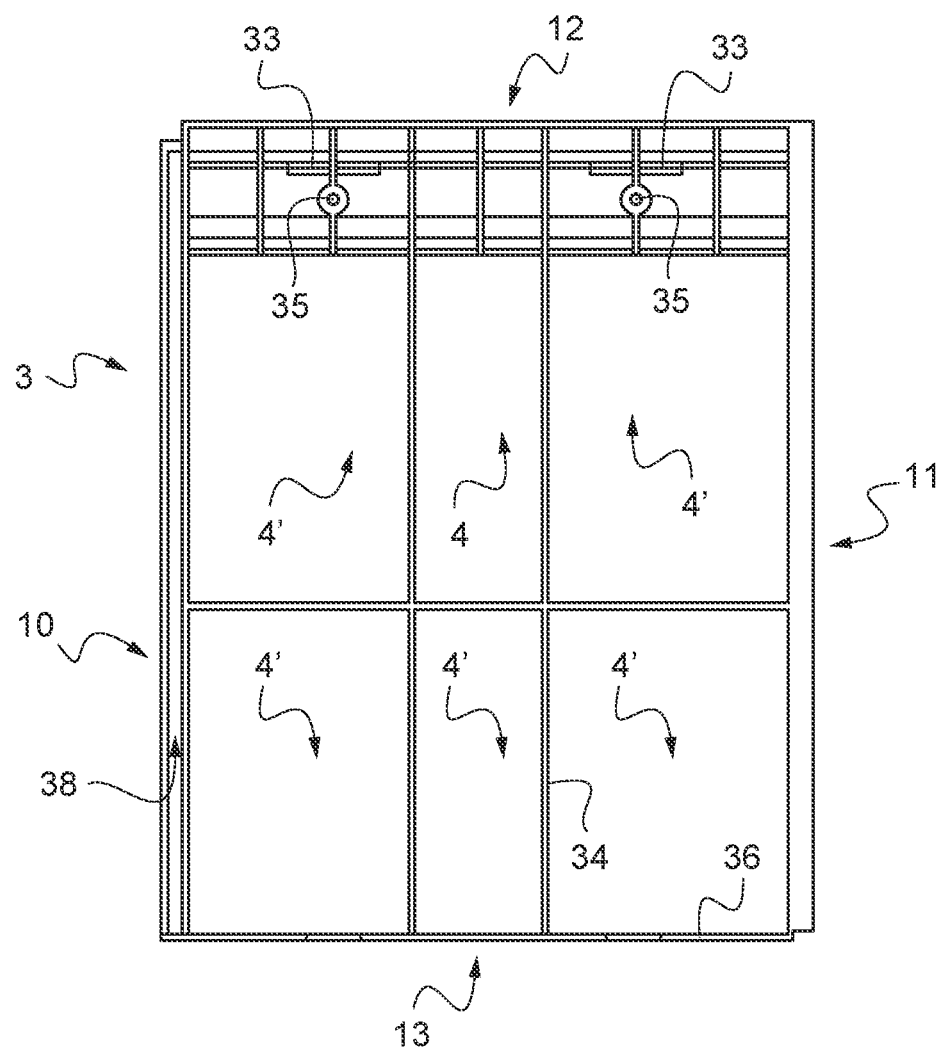
FIG. 15 shows a rear view of the shell of a photovoltaic tile open on the rear side.
Figure 16:
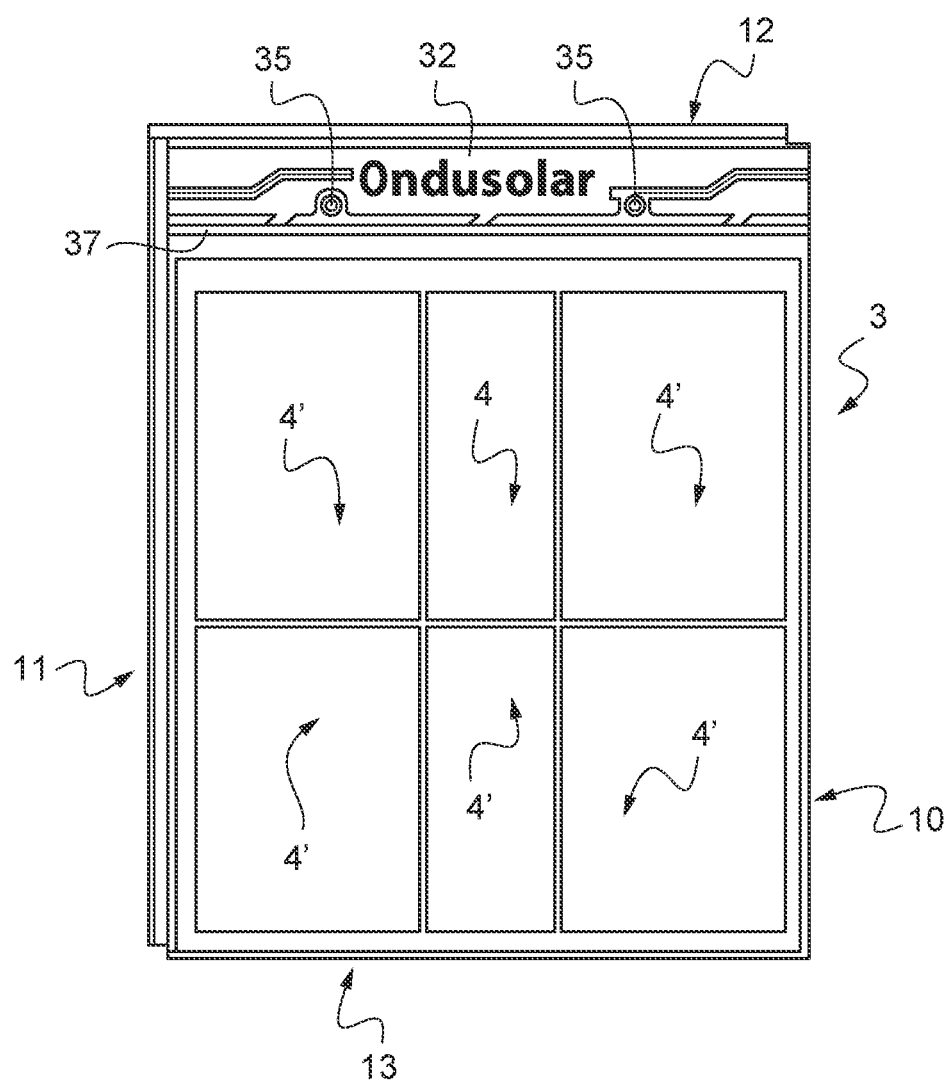
FIG. 16 shows a front view of the shell of the photovoltaic tile of FIG. 15.

The photovoltaic tile 1, 1' is consisted of a shell 3 made of rigid plastic material and a photovoltaic element including one photovoltaic power generation unit 2 (FIGS. 1 to 4) or several ones 2a, 2b, 2c (three FIGS. 5 to 8). Ribs 34 are arranged on the rear face of the shell 3 in order to reinforce the photovoltaic tile 1, 1'. An example of shell 3 is shown in more detail in FIGS. 15 and 16 and this shell is usable for a photovoltaic tile having one photovoltaic element with one power generation unit. It is to be noted that the rear face of the shell 3 can be essentially closed except a hole 4 for electrical connections (in particular, FIGS. 1 to 8) or essentially open (FIGS. 15 and 16). An open rear face with passage ways 4' as in FIGS. 15 and 16 has for advantage to facilitate the thermal convection around the photovoltaic element.

The photovoltaic element is fastened in the thickness of the shell 3, preferably by bonding, which also allows providing watertightness between the two faces of the tile. The shell 3 includes a rear face side 15, a hole 4 providing access to the rear face of the photovoltaic element 2, 2a, 2b, 2c for access to the connection means 20 and passage of the two electrical connection cables.

The plastic material of the shell is a plastic material resistant to weather, solar radiation and more generally to the environment outside a house.

The plastic material of the shell 3 is Polyphenylene Oxide (PPO) including glass fibres and a flame retardant. The plastic material of the shell preferably includes at least one pigment.

The photovoltaic tile 1, 1' has parts that are overlapped and other parts that overlap adjacent tiles in the roof consisted of the assembly of the photovoltaic tiles 1, 1' in such a way as to ensure watertightness to liquid water.

On the upstream edge side 12, an upstream part 32 of the front face 14 of the photovoltaic tile 1, 1' is intended to be overlapped by a downstream part of the photovoltaic tile 1, 1' of the row above along the roof pitch. This upstream part 32 is consisted of the single shell 3, the photovoltaic element being not present therein due to the absence of solar radiation in this upstream part 32. This upstream part includes through-holes 35 for the fastening of the tiles to a batten 8, in particular by spikes, nails or screws. The tenon(s) 33 are located on the rear face side 15, at the upstream part 32 and little higher than the through-holes 35 in the pitch direction. In other words, the tenon(s) 33 are closer to the upstream edge 12 than the through-holes 35.

In an alternative embodiment, the battens are prefabricated and include pins directed upward and whose spacing corresponds to the spacing between the two through-holes of the tile. The batten pins are hence fasteners pre-installed on the batten-type holding devices. These pins may include means for clipping into the through-holes.

Still more advantageously, these pins are electrically conductive, forming a male connector, and the through-holes are also electrically conductive and form female connectors connected to the photovoltaic element or to each power generation unit, hence allowing an automatic electrical connection. In such an alternative embodiment, the battens preferably include electrical circuits allowing a wiring adapted to the needs, in particular in series and/or in parallel between the tiles or tile sub-sets. The current and voltage generated by the photovoltaic tiles being direct current, two connections per tile, a positive pole and a negative pole, are sufficient. The battens can thus form flow buses for the current generated and, according to the case, form serial adapters between tiles and/or parallel adapters on a bus.

Conversely, for the automatic electrical connection, the battens can include connection receiving holes for pairs of conductive pins of each tile, these pins extending rearward from the tile and inserting into the receiving holes. In another alternative automatic electric connection, both battens and tiles include conductive through-holes, and therein are installed nails or screws, with tapped holes, or pins for electrical connection between them, allowing both tile-to-batten fastening and electrical connection between tiles and battens forming current flow buses.

At the limit between the upstream part 32 and the shell part that contains the photovoltaic element, an upstream groove 37 is arranged in the front face 14 and is intended to receive a downstream protruding line 36, protruding rearward, located along the downstream edge 13 on the rear face 15 of the photovoltaic tile 1, 1'. A sealing paste, for example silicon, may possibly be injected into the upstream groove 37 when installing the tiles. As an alternative implementation, a flexible (=compressible) gasket is installed into the upstream groove 37. As an alternative implementation, a flexible gasket is installed overlapping on the downstream protruding line 36.

However, and preferably, no additional element is implemented to ensure watertightness between the tiles, the simple assembly and fitting together of the tiles ensuring this watertightness.

In a mode of implementation, clipping means are provided between the front face 14 in the upstream part 32 and the rear face 15 in the downstream part that overlap each other, in other to hold the two overlapping/partially covering tiles tightly together along the pitch.

Along the left lateral edge 11, a left lateral part of the front face 14 of the photovoltaic tile 1, 1' is intended to be overlapped by a right lateral part of the adjacent photovoltaic tile 1, 1' of the same row. This left lateral part is consisted of the single shell 3, the photovoltaic element being not present therein due to the absence of solar radiation in this left lateral part. This left lateral part includes a left lateral groove 31 parallel to the left lateral edge 11 and arranged in the front face 14. The left lateral groove 31 is intended to come opposite a right lateral counter-groove 38, on the rear face 15 side, and arranged along the right lateral edge 10. A flexible gasket (not shown) is installed in the left lateral groove 31 and compressed by the right lateral counter-groove 38 during installation of the tiles 1, 1'. As an alternative, the left lateral groove 31 includes a flexible gasket and the right lateral counter-groove 38 includes another flexible gasket, and these two gaskets are compressed together during installation of the tiles 1, 1'.

As an alternative embodiment, the left lateral groove 31 is intended to receive a right lateral protruding line, located along the right lateral edge, and protruding rearward from the rear face 15 of the photovoltaic tile 1, 1', similarly to what is done for the upstream groove 37 and the downstream protruding line 36. In this latter alternative, a sealing paste, for example silicon, may possibly be injected into the left lateral groove 31 when installing the tiles. In an alternative implementation, a flexible gasket is installed into the lateral groove 31. In an alternative implementation, a flexible gasket is installed overlapping on the right lateral protruding line.

Figure 19:
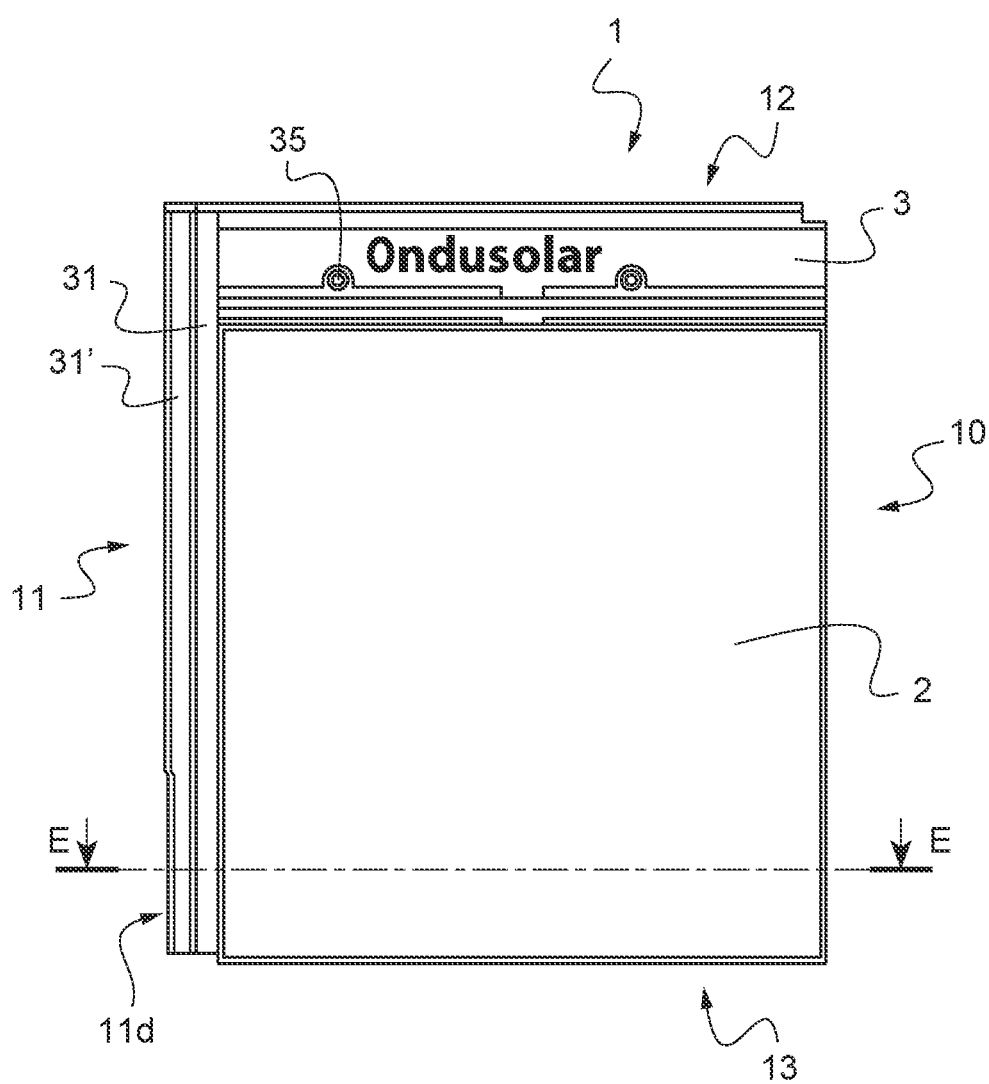
FIG. 19 shows a front view of photovoltaic tiles with increased lateral overlap, just as the following.
Figure 20:
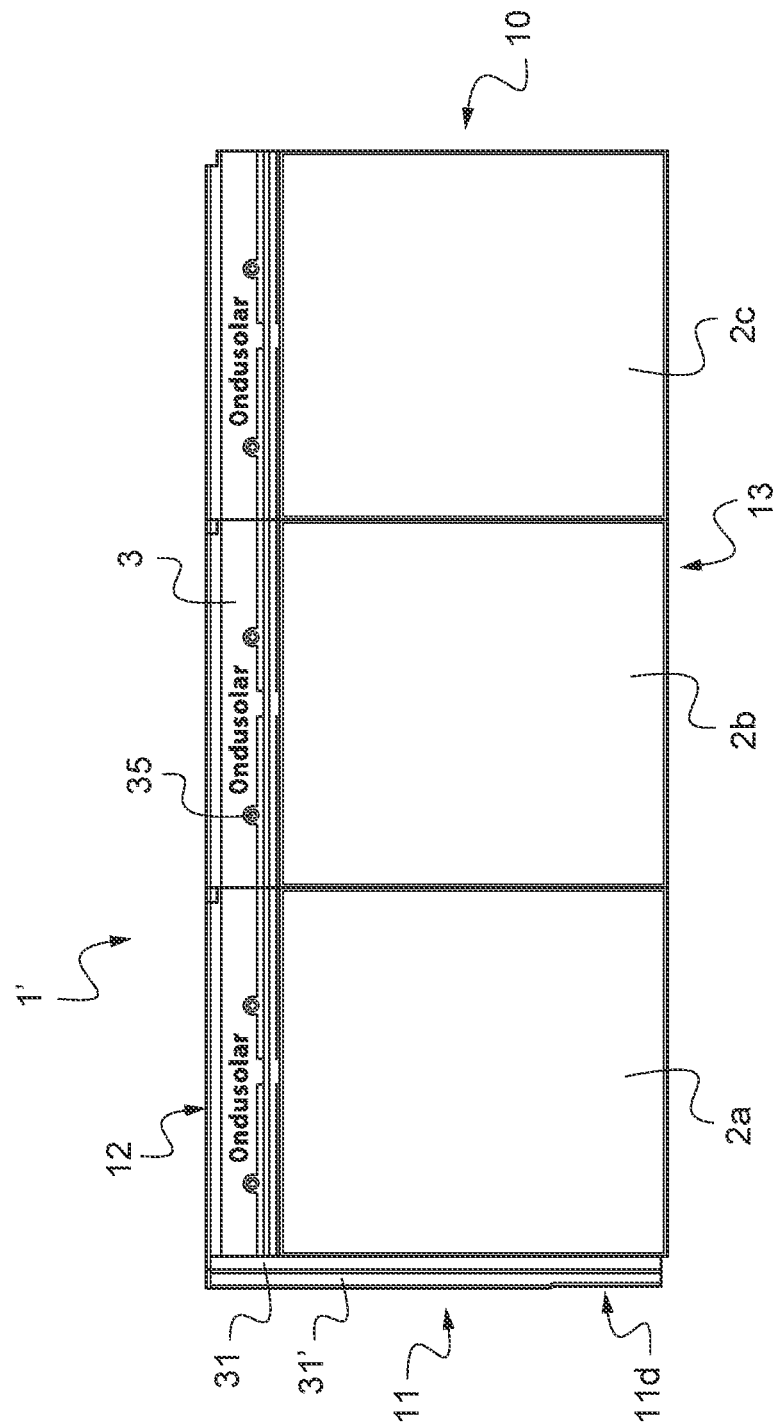
FIG. 20 shows a front view of photovoltaic tiles with increased lateral overlap.
Figure 21:
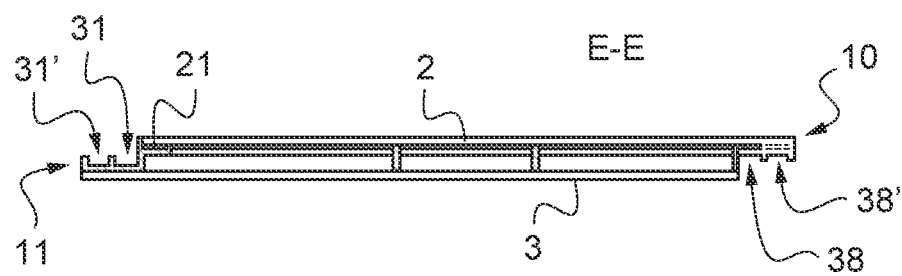
FIG. 21 shows a cross-sectional view along line E-E of the photovoltaic tile of FIG. 19.

In order to reinforce the watertightness between the tiles, in particular on their right and left lateral sides, it is possible to increase the overlapping width between the overlapping right and left lateral edges of the photovoltaic tiles. It is further provided, as shown in FIGS. 19, 20 and 21, to double the lateral grooves and lateral counter-grooves. Therefore, two left lateral grooves 31 and 31' and two right lateral counter-grooves 38 and 38' can be seen in FIG. 21. The two lateral grooves 31 and 31' are side-by-side and parallel to each other. The two lateral counter-grooves 38 and 38' are side-by-side and parallel to each other. The grooves and counter-grooves can be right and left side swapped but all the tiles have an identical groove and counter-groove configuration in such a way that these latter can be assembled together facing each other and in overlapped relation.

In the case of simple grooves, the tile overlap width on the right and left lateral edge sides is of about 11 mm. In the case of double grooves, the tile overlap width on the right and left lateral edge sides is of about 30 mm.

Figure 22:
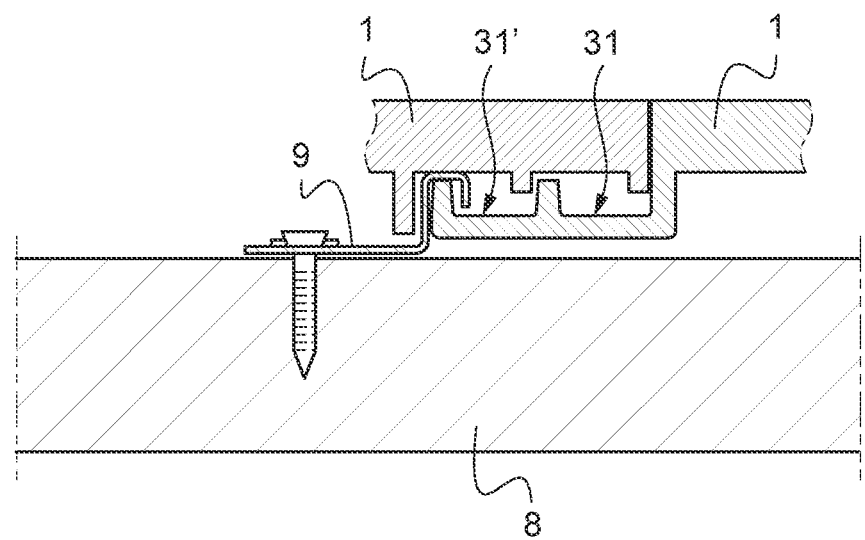
FIG. 22 shows a cross-sectional, left lateral side view of the tile, at a holding stud or hook 9 of the tile.

It can be noted in FIGS. 19 and 20, in which it is better visible, that the tile left lateral side 11 includes, downstream, a cut-out 11d of about 1 mm. This cut-out 11d is intended to allow, if necessary, the installation of a tile holding stud or hook 9 as can be seen in FIG. 22. This stud or hook is, on the one hand, screwed or nailed in the roof frame or the batten 8, and in the other hand, is hooked to the tile edge, on the left lateral side. It is understood that a suitable cut-out is provided in correspondence to the lower face of the tile, on the right lateral edge side 10.

In a mode of implementation, clipping means are provided between the front face 14 and the rear face 15 between the right and left lateral edges of two adjacent tiles of a same row.

It is understood that "right" and "left" are indicative and that the lateral grooves, counter-grooves and/or protruding lines can be side swapped with respect to the drawings. It is also understood that, in order to be compatible for installation, the tiles have identical groove, counter-groove and/or protruding line configurations.

Preferably, grooves are implemented upstream and laterally, on the front face side 14, and it is made sure that the upstream groove communicates with the lateral groove and it is provided that any water present in a lateral groove of an above tile along the pitch can move to the adjacent tile just below, in order for any liquid water that may have passed in the groove to be collected and drained down along the pitch.

The photovoltaic element is consisted of several parts ensuring, in addition to the photovoltaic power generation, watertightness and resistance, in particular to abrasion on the front face side 14.

For power generation, a monocrystalline or polycrystalline silicon-based plate is implemented. This plate may be monolithic or may result from the assembly of several silicon-based circuits. The silicon-based plate is sandwiched/encapsulated between two Ethylene Vinyl Acetate (EVA) plastic material films and a tempered glass layer forming a transparent layer is positioned against the upper Ethylene Vinyl Acetate plastic material film, hence on the side intended to receive the solar radiation. It results therefrom that the photovoltaic tile front face is consisted of the tempered glass layer in the power generation area and of the plastic material of the shell outside of this area. The power generation area does not extend in the lateral parts and the upstream parts that are covered by the partial overlap of the tile edges. On the contrary, the downstream part that overlaps the upstream part and whose front face is hence free preferably belongs to the power generation area.

EVA is chosen to withstand the high temperatures to which the photovoltaic elements may be subjected due to their operation under the sun. Preferably, a rear panel supports the EVA-encapsulated silicon-based plate.

The photovoltaic element hence includes from the bottom/rear (roof frame side) to the top/front (sky and sun side): the rear panel, the lower Ethylene Vinyl Acetate plastic material film, the silicon-based plate, the upper Ethylene Vinyl Acetate plastic material film and the tempered glass layer.

Two models of silicon-based plate are provided, as shown in FIG. 17, for a so-called "classic" model, and FIG. 18, for another model.

It is to be noted that two terms are used to refer to the power generation part within the photovoltaic tile: on the one hand, "photovoltaic element", and on the other hand, "photovoltaic generation unit". These two terms can in fact denote the same object in the case where the tile includes a single silicon-based photovoltaic conversion plate. The term "photovoltaic generation unit" is rather used in the case where the tile includes several silicon-based photovoltaic conversion plates with a single common EVA-encapsulation and a single electrical connection means 20, which is common to the silicon-based plates, either with series and/or parallel connections within the tile between the silicon-based plates. It is also provided a tile containing several photovoltaic elements, each photovoltaic element being individually EVA-encapsulated, the tile having a single electrical connection means (common to the photovoltaic elements) or several ones (individual to each photovoltaic element).

Chemical bonds are used between the photovoltaic element and the shell, the photovoltaic element being fastened in a housing formed in the shell thickness, the rear panel being then in contact with the shell within this housing in the case of a shell closed on the rear side (except at the hole 4). In particular, the photovoltaic element is bonded in its housing against the shell, with a silicon glue 21, which also ensures the watertightness between the tile front and rear at the photovoltaic element 2, 2a, 2b, 2c. The glue is applied on the housing perimeter that has a rim for receiving the photovoltaic element.

In the case of a shell open on the rear side (FIGS. 15 and 16), leaving passage ways 4' in addition to the hole 4 between the ribs 34, the rear panel is applied, and possibly bonded, against these ribs 34.

The photovoltaic element has for advantage that it has no bright metal part that could compromise the aesthetic of the flat photovoltaic tile.

In order to increase the tile installation productivity, it is also proposed, in relation with FIGS. 5 to 8, a photovoltaic tile 1' that includes a photovoltaic element consisted of three photovoltaic generation units 2a, 2b, 2c, laterally juxtaposed in alignment with each other. This photovoltaic element may be monolithic/one-piece or be consisted of three independent parts electrically connected to each other. If, preferably, the shell 3' includes a single housing for these three units (monolithic or three-independent-part photovoltaic element), a shell 3' with three housings (three-independent-part photovoltaic element) can be provided. This photovoltaic tile 1', of large width (measured along a row), is equivalent to a row of three photovoltaic tiles 1 of the type of FIGS. 1 to 4 as regards the size and the possibilities of assembly with other photovoltaic tiles 1 or 1'. The electrical connection means 20 of this photovoltaic tile 1' is common to the three generation units and thus includes two flexible electrical connection cables, a positive one and a negative one, and with MC4 connectors. In a serial model of the tile 1', it is provided that the three photovoltaic generating units 2a, 2b, 2c are connected in series to generate three times the voltage of a simple photovoltaic generation unit 2. In a parallel model of the tile 1', it is provided that the three photovoltaic generating units 2a, 2b, 2c are connected in parallel to generate at least three times the intensity of a simple photovoltaic generation unit 2.

Finally, according to the cases, protection devices can be provided for the unit 2 or the units 2a, 2b, 2c, such as resettable fuse (for example, PTC), bypass diode . . . . It may also be provided to install an infrared light-emitting diode, hence not humanly visible, at the surface of the tile and connected in parallel to the photovoltaic element, making it possible to check the tile operation with an infrared video camera or still camera rather than referring to the temperature of the photovoltaic element.

It is understood that it is also possible to make photovoltaic tiles with two or more than three photovoltaic generation units.

The plastic material of the shell 3 is preferably coloured in a tile shade. Preferably, the photovoltaic element is also similarly coloured. The intensity and colour of the photovoltaic element shade are chosen in such a way as to find a compromise between the conversion efficiency losses and the tile appearance. Preferably, the shade is made in the tempered glass.

The thicknesses of the different parts are the following: the tempered glass is about 3.2 mm, the silicon is encapsulated into an EVA film of about 0.5 mm thick per face, the rear panel has a thickness of about 0.35 mm and is made of rigid plastic material. The total thickness of the photovoltaic tile, without the tenon(s) and the potential tabs, is 20 mm.

Figure 12:
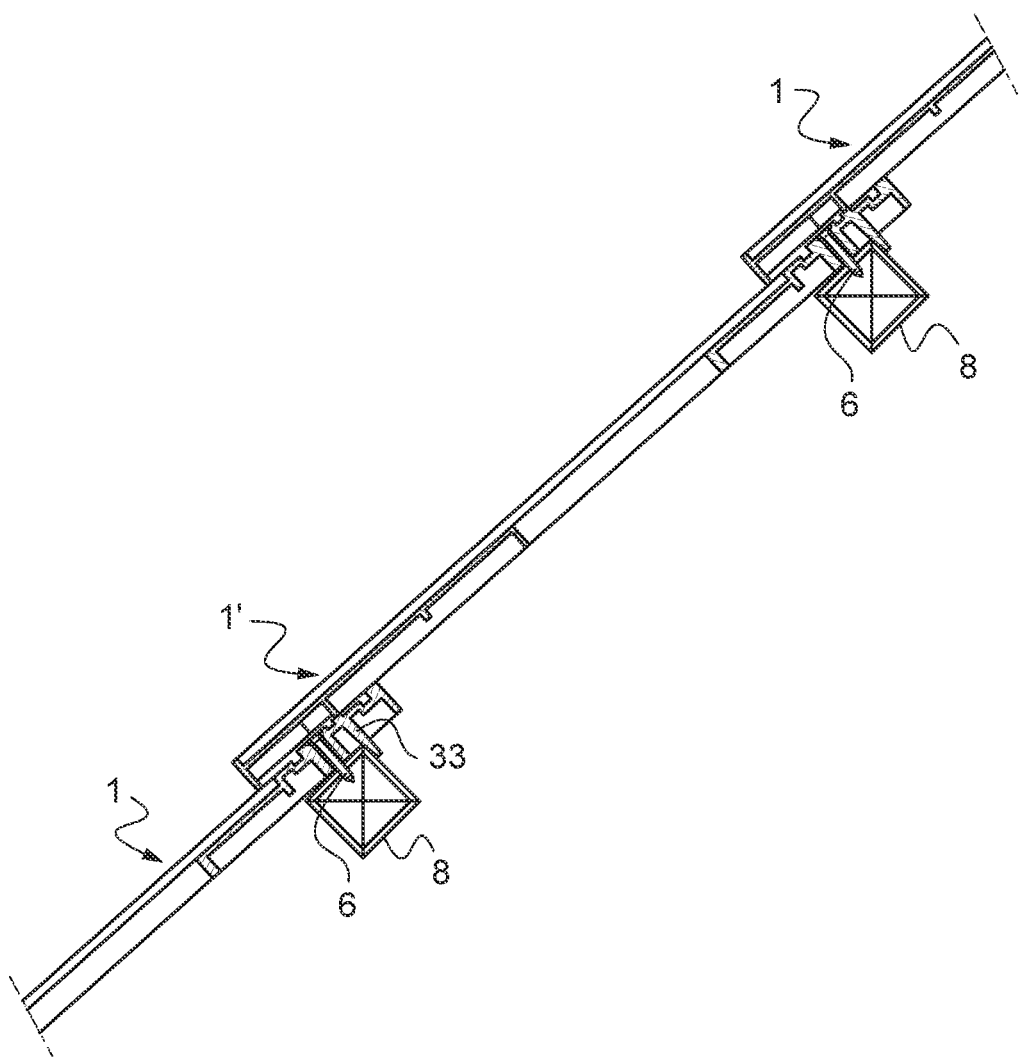
FIG. 12 shows a cross-sectional view of a pitched roof on which photovoltaic tiles have been installed on battens.
Figure 13:
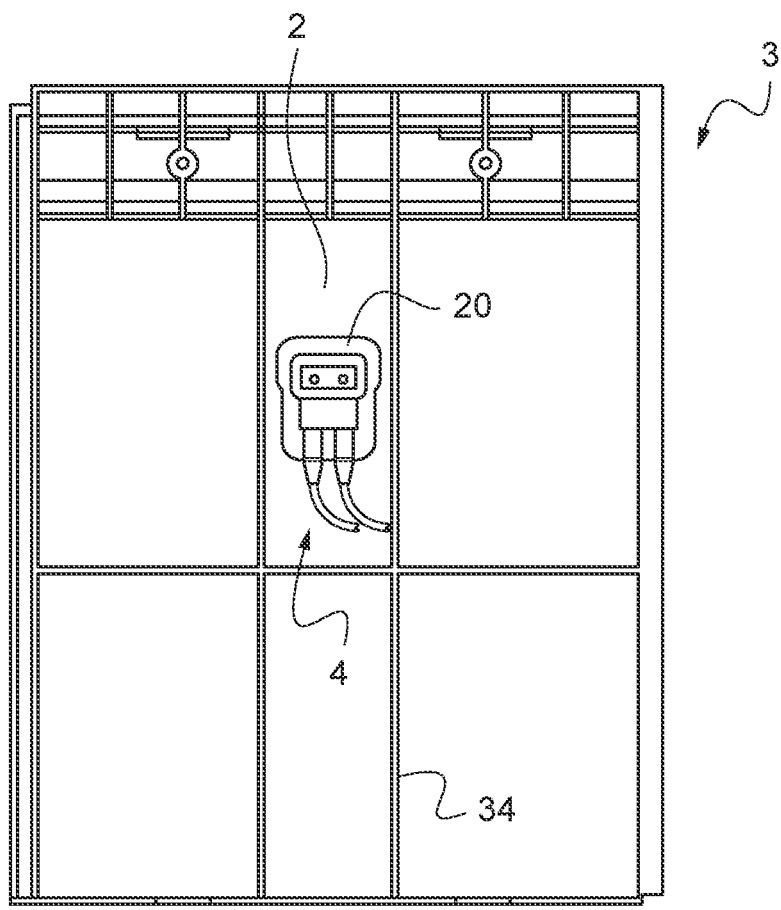
FIG. 13 shows a rear view of a photovoltaic tile of the type of that of FIG. 1.
Figure 14:
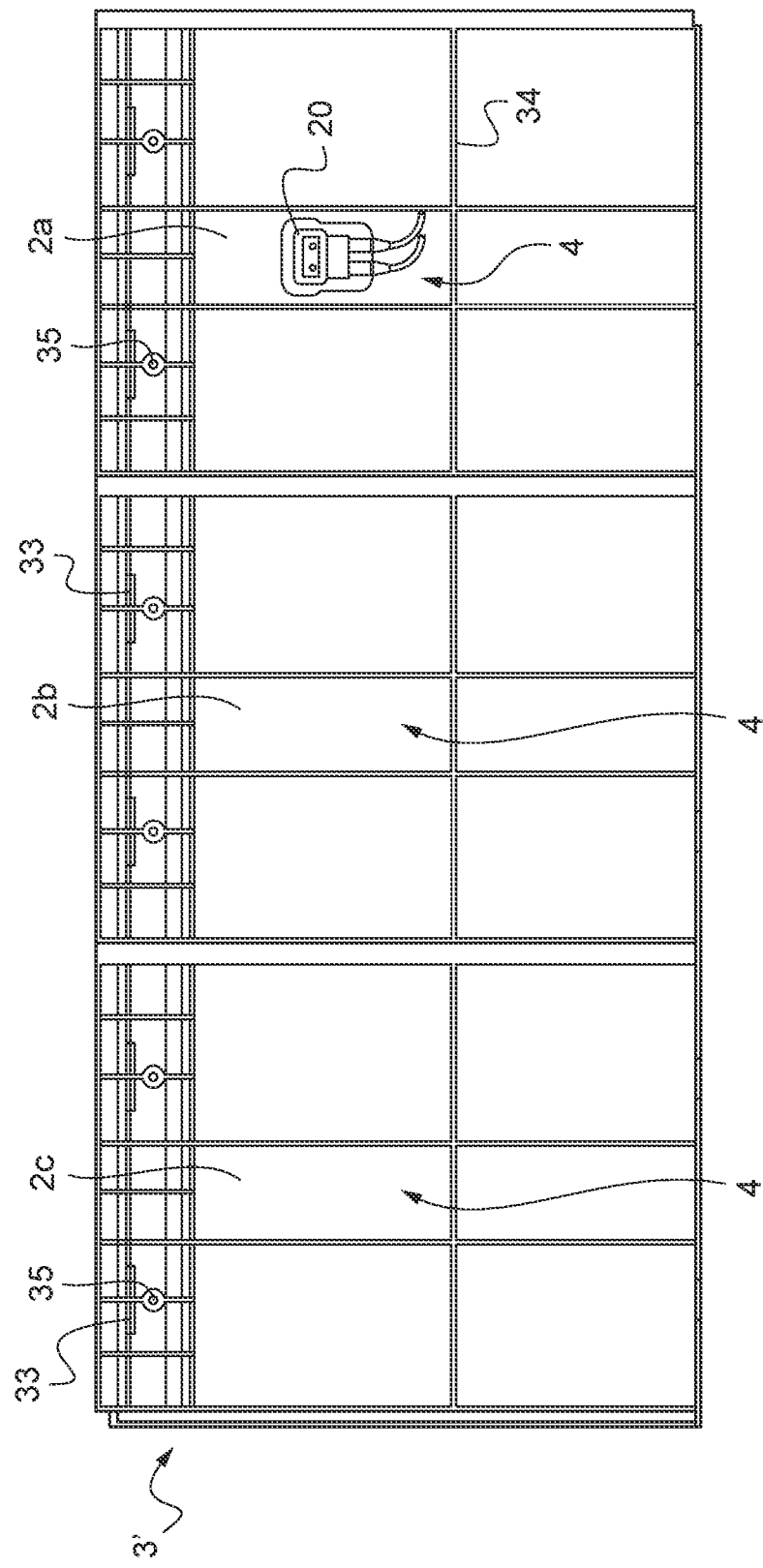
FIG. 14 shows a rear view of a photovoltaic tile of the type of that of FIG. 5.

During roof installation or renovation, battens 8 are fastened to the roof frame, parallel to the roof ridge line. The photovoltaic tiles are placed on the battens 8, starting from the bottom of the roof. The photovoltaic tiles are temporarily held on the battens (or a corrugated sheet described hereinafter) by their tenons 33, until the roofer fastens them by nails 6 (or an equivalent of nail, including screws) inserted into the through-holes 35. The tenons 33 and the through-holes 35 are arranged in such a way that the through-holes 35 are located facing the batten 8 when the photovoltaic tile is held by the tenon 33 onto the batten 8, the batten having generally a standard size. It is understood that the electrical connections of a tile are made before its fastening with nails, in order to have access to the tile electrical connection means 20 that is on the rear face. The result is visible in FIG. 12 (the electrical wires are not shown for the sake of simplification), in which the photovoltaic tiles 1 and 1' have been mixed to show their compatibility.

The installation of the tiles 1, 1' is hence made from the bottom of the roof, and the tiles are preferably staggered from one row to the following along the roof pitch line, as shown in FIGS. 17 and 18. In an alternative, the tiles are aligned along the roof pitch line.

The battens, which have a certain thickness, involve that the photovoltaic tiles are not applied against the roof frame and the vapour barrier that is usually installed. There thus exists a small space between the tile and the roof frame that allows, when the battens are not continuous, a certain air flow in the pitch direction in addition to the row direction.

Figure 9:
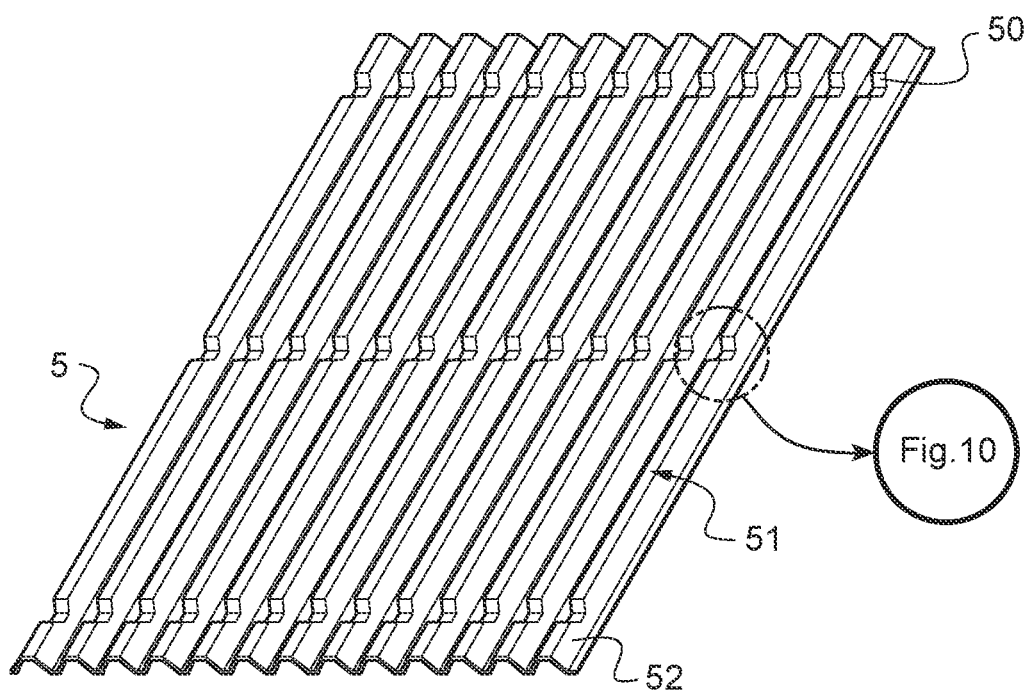
FIG. 9 shows a perspective view of a corrugated roof deck sheet intended to support the photovoltaic tiles on a roof frame.
Figure 10:
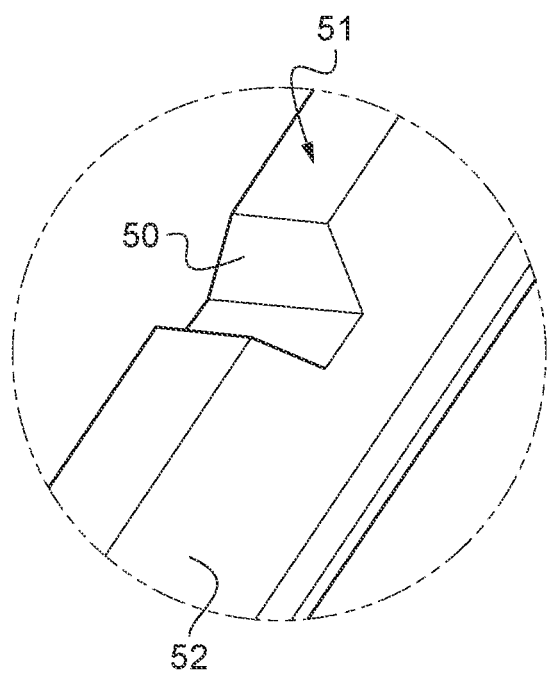
FIG. 10 shows an enlarged view of a part of the corrugated roof deck sheet of FIG. 9, such part including a recessed area.
Figure 11:
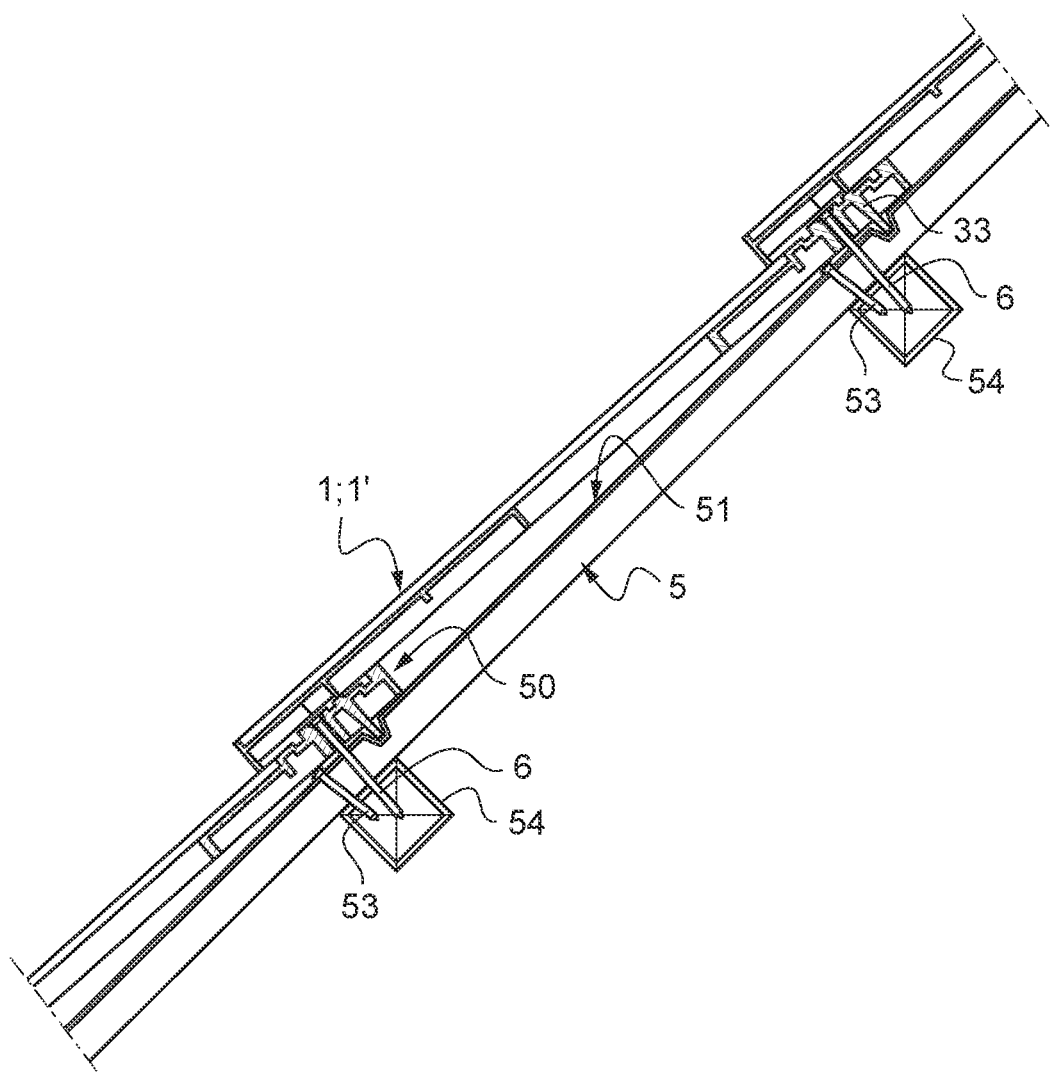
FIG. 11 shows a cross-sectional view of a pitched roof on which has been installed a corrugated roof deck sheet supporting photovoltaic tiles.

The air flow efficiency in the pitch direction can however be further increased using, on the roof frame, a corrugated roof deck sheet 5 as described in the patent application FR96/13766 and on which the photovoltaic tiles are installed. This corrugated sheet 5 shown in FIGS. 9 to 11 further has for advantage not to require the use of battens because it allows the hooking of the flat photovoltaic tiles 1, 1'. Indeed, this corrugated sheet 5 has corrugations 52 and includes, on one of its surfaces, recessed areas 50 in the convex part 51 of the corrugations. These recessed areas 50 allow the flat photovoltaic tiles to be hooked by their tenons 33 directly to the corrugated roof deck sheet 5.

This corrugated sheet 5 has regular deep waves, substantially sinusoidal, which increases its bending resistance and the solidity of the roofs in which it is used, and thanks to which a perfect drainage is possible.

In alternatives, the corrugated sheet may have an alternation of waves and flat areas and/or the corrugations 52 may be different, for example of the Greek type or in V-shape.

The recessed areas 50 are advantageously distributed along straight lines substantially perpendicular to the corrugations 52 in order to define rows. The depth and locations, in particular distances, of the recessed areas 50 are designed to allow the photovoltaic tile tenons 33 to be received and held. Advantageously, the apex of the convex part 51 of the corrugations is slightly flattened and can have a rough surface in order to avoid any risk of under-roof deformation and tile sliding.

During roof installation or renovation, such corrugated sheets 5 are fastened by nails 53 or equivalent on the roof frame 7, in such a way that they partially overlap each other and that the corrugations 52 are directed along the roof pitch direction. Any suitable corrugated sheet fastening means, preferably placed on the corrugation apex, can be used. The photovoltaic tiles 1, 1' are then directly installed on the roof desk formed by the corrugated sheets 5. It is understood that, in the absence of battens, the photovoltaic tiles can be fastened, through their through-holes 35, directly to the underlying corrugated sheet 5. In an alternative shown in FIG. 11, still in the absence of battens, the photovoltaic tiles are fastened to the roof frame 7 by nails 6, through their through-holes 35. In this last case, and when the roof frame is in the roof pitch direction, it is advantageous to implement photovoltaic tiles 1' that each include several photovoltaic generation units and that are hence of large width, so as to have at least two of the through-holes 35 of a photovoltaic tile 1' facing the roof frame.

In an alternative installation, instead of installing the tiles 1, 1' directly on the corrugated sheets, with their tenons 33 placed in the recessed areas 50, battens are first installed in the recessed areas 50, then the tiles 1, 1' are positioned on the battens, held to these latter by their tenons 33. This latter solution amounts to an assembly on battens, but with a corrugated roof desk sheet previously installed. The material of the corrugated sheets can for example be a bitumen-impregnated cellulosic material, a plastic material, such as PVC, or also steel. The corrugated sheet profile allows a good ventilation of the roof, with an easy water vapour flowing, and facilitates the passage of the electrical cables from one row to the other along the roof pitch. It is to be noted that additional set-back areas such as recessed areas can be provided, these set-back areas being intended for the passage of electrical cables along a row, between the corrugations.

During tile installation, in addition to the fastening to the battens, mechanical connections may be provided, in particular clipping, and/or chemical bonds between the tiles of one row and/or between the rows, wherein the bonding may correspond to the application of a polymerizable pasty gasket between the tiles.

It is understood that the tile of the invention can be made in many ways. For example, it is provided to add, at the surface of the tile, a coloured film of plastic material, wherein the film can further comprise visual patterns intended to give particular visual impression.

Finally, it is provided to make dummy tiles of similar shape and appearance to the photovoltaic tiles for installation in areas in which it is not desired or impossible to generate power (for example due to the presence of a chimney creating a shadow area). An optimized roof can hence be made, in which the photovoltaic tiles are placed only in favourable locations, and with a homogeneous aspect.

The invention claimed is:

1. A flat photovoltaic tile intended to form a covering for a pitched roof by juxtaposing a set of tiles in partial edge-to-edge overlap, the tile including a shell and at least one flat photovoltaic power generation element, the shell being rigid and made of plastic material, the photovoltaic element being fastened in a housing formed in the shell thickness, the tile having two opposite faces and four edges:
   a front face and a rear face, the front face being intended to receive a solar radiation,
   an upstream edge and a downstream edge, opposite and parallel to each other, the upstream edge being intended to be installed higher than the downstream edge in the pitched roof covering, an upstream part located along the upstream edge of the tile being intended to be overlapped by a downstream part located along the downstream edge of at least another tile of the covering,
   a right lateral edge and a left lateral edge, opposite and parallel to each other, two lateral parts along the two right and left lateral edges being intended to respectively overlap and be overlapped by lateral parts of the left and right lateral edges, respectively, of two other adjacent tiles of a same row of tiles of the covering, the overlapping lateral parts of the tiles as well as the overlapping upstream part and downstream part of the tiles being configured in such a way as to ensure watertightness to at least the liquid water flowing on the roof, the photovoltaic element forming a power generation area, the tile being configured in such a way that the power generation area extends over the tile outside of the tile parts that are intended to be overlapped, the tile further including an electrical connection means for exporting the power generated by the photovoltaic element, the rear face including, towards the upstream edge, at least one tenon protruding rearward from the flat general extent of the rear face, said at least one tenon being intended to hold the tile on a holding device, and on the one hand, in the power generation area, the tile includes, in thickness, from the rear face towards the front face:

a shell part,
a rear panel,
a lower Ethylene Vinyl Acetate film,
at least one silicon-based photovoltaic conversion plate,
an upper Ethylene Vinyl Acetate film, and
a transparent layer consisted of tempered glass, and
on the other hand, outside of the power generation area, the tile includes, in thickness, the plastic material of the shell, the silicon-based plate of the photovoltaic element being hermetically encapsulated in the Ethylene Vinyl Acetate film, the electrical connection means passing through the film, the tile upstream part, intended to be overlapped, further including, on the front face, at least one hole, and the tile downstream part further including, on the rear face, at least one tab protruding rearward, said at least one hole and at least one tab being of complementary shapes in such a way that, when the tile upstream part is overlapped by the downstream part of another tile, the tab of the other tile is engaged into the tile hole, and wherein one of the left lateral edge and the right lateral edge of the tile includes, at a downstream part of the tile, a cut-out configured to allow the installation of a tile holding stud or hook to be fixed to a roof frame or to battens.

2. The flat photovoltaic tile according to claim 1, wherein the housing formed in the thickness of the shell has a flat bottom and wherein the flat bottom of the housing includes a through-hole for the passage of the electrical connection means arranged on the rear face side of the photovoltaic element.

3. The flat photovoltaic tile according to claim 1, wherein the upstream part includes through-holes for the passage of fasteners to fasten the tile to the roof.

4. The flat photovoltaic tile according to claim 1, wherein said at least one hole has a bottom and wherein said at least one hole and said at least one tab have complementary shapes including interlocking means.

5. The flat photovoltaic tile according to claim 1, wherein the flat voltaic tile has a substantially uniform thickness, said thickness being between 25 mm and 15 mm.

6. The flat photovoltaic tile according to claim 1, wherein the electrical connection means is consisted of two flexible electrical cables exiting from the tile rear face.

7. The flat photovoltaic tile according to claim 1, further comprising a lateral groove and a lateral counter-groove or further comprising two lateral grooves and two lateral counter-grooves.

8. The flat photovoltaic tile according to claim 4, wherein the interlocking means of said at least one hole and said at least one tap are of the clipping type.

9. The flat photovoltaic tile according to claim 1, wherein the electrical connection means includes two rearward pins compatible with a batten having two connection receiving holes for said pins, the battens forming current flow buses.

10. A method for installing photovoltaic tiles, wherein, on a pitched roof including holding devices aligned in several rows, parallel to a ridge line of the roof, the holding devices being chosen among battens and corrugated sheets having recessed areas in the convex part of their corrugations, a set of flat photovoltaic tiles according to claim 1 is installed, starting from the bottom of the roof, each tile being first held by said tile's tenon(s) on the corresponding holding device before being fastened by fasteners to the corresponding batten or to an element of a roof frame by passing through the corresponding corrugated sheet, before installation of the upper row tile, the fasteners being passed through through-holes of the upstream part of the tile, and wherein each of the flat voltaic tiles has, at a downstream part at one of a left lateral edge and a right lateral edge, a cut-out configured to allow the installation of a tile holding stud or hook to be fixed to a roof frame or to the battens, and wherein the method comprises installing said tile holding studs or hooks at the cut-out to hold the flat photovoltaic tiles.

11. A roof covering including a juxtaposition of a set of flat photovoltaic tiles according to claim 1, the covering including battens and/or corrugated sheets having recessed areas in a convex part of their corrugations.

12. The flat photovoltaic tile according to claim 1, comprising several photovoltaic elements in the shell, each photovoltaic element being individually EVA-encapsulated.

13. The flat photovoltaic tile according to claim 1, wherein the upstream part includes through-holes for the passage of fasteners to fasten the tile to the roof, and said at least one hole has a bottom and wherein said at least one hole and said at least one tab have complementary shapes including interlocking means, the interlocking means of said at least one hole and said at least one tap being of the clipping type.

14. The flat photovoltaic tile according to claim 13, comprising several photovoltaic elements in the shell, each photovoltaic element being individually EVA-encapsulated.

15. The flat photovoltaic tile according to claim 2, wherein the upstream part includes through-holes for the passage of fasteners to fasten the tile to the roof.

16. The flat photovoltaic tile according to claim 2, wherein said at least one hole has a bottom and wherein said at least one hole and said at least one tab have complementary shapes including interlocking means.

17. The flat photovoltaic tile according to claim 3, wherein said at least one hole has a bottom and wherein said at least one hole and said at least one tab have complementary shapes including interlocking means.

18. The flat photovoltaic tile according to claim 1, wherein the flat voltaic tile has a substantially uniform thickness, said thickness being about 20 mm.

19. The flat photovoltaic tile of claim 1, wherein the cut-out is disposed on the lateral edge that is configured to be overlapped by an adjacent said tile, the lateral edge that comprises the cut-out further comprising a lateral groove parallel to the lateral edge within a portion of the lateral edge that is configured to be overlapped by an adjacent said tile.

20. The method of claim 10, wherein installing the tile holding studs or hooks comprises securing each said tile holding stud or hook to the pitched roof at the batten or the element of the roof frame next to the photovoltaic tile so that a portion of the tile holding stud or hook extends away from the pitched roof and through the cut-out, the tile holding stud or hook being shaped so as to extend over the lateral edge in which the cut-out is disposed, thereby securing the photovoltaic tile to the pitched roof.

* * * * *